United States Patent
Pai et al.

(10) Patent No.: US 10,650,403 B2
(45) Date of Patent: May 12, 2020

(54) DISTRIBUTING ONLINE ADS BY TARGETING ONLINE AD REQUESTS

(71) Applicant: ADOBE INC., San Jose, CA (US)

(72) Inventors: Deepak Pai, Santa Clara, CA (US); Anil Kamath, Los Altos Hills, CA (US)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 15/264,053

(22) Filed: Sep. 13, 2016

(65) Prior Publication Data

US 2018/0075475 A1    Mar. 15, 2018

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0247* (2013.01); *G06Q 30/0275* (2013.01); *G06Q 30/0277* (2013.01)

(58) Field of Classification Search
CPC ...................................................... G06Q 30/00
See application file for complete search history.

(56) References Cited

U.S. PATENT DOCUMENTS

| | | | | |
|---|---|---|---|---|
| 8,571,930 B1* | 10/2013 | Galperin | ............ | G06Q 30/0273 705/14.43 |
| 2013/0080264 A1* | 3/2013 | Umeda | .................. | G06Q 30/02 705/14.69 |
| 2015/0278877 A1* | 10/2015 | Yi | ....................... | G06Q 30/0275 705/14.71 |

OTHER PUBLICATIONS

Liquet et al., Group and sparse group partial least square approaches applied in genomics context, Sep. 10, 2015, Bioinformatics (Year: 2015).*
Merging sparse and dense data in machine learning to improve the performance, Apr. 2016, datascience.stackexchange.com (Year: 2016).*

* cited by examiner

*Primary Examiner* — Naresh Vig
(74) *Attorney, Agent, or Firm* — Brake Hughes Bellermann LLP

(57) ABSTRACT

Techniques for distributing online ads by targeting online ad requests using test data to predict performance. The techniques can target ad requests in automated online advertising systems in which ad requests are generated by an ad exchange server and bids are placed by marketer devices in real time. The techniques aggregate bid units and compare bid unit characteristics to select bid units to target in ways that address data sparsity, variance, and volume issues. Data sparsity issues are addressed by aggregating bid units to avoid using bid units having insufficient data. Data variance issues are addressed by computing stability metrics for bid units that enable discounting the effect of outliers. Data volume and processing efficiency issues are addressed by grouping similar bid units based on similar metrics (e.g., normalized ROI) and/or similar stability scores, and then ranking the bid units and selecting the top ranked bid units to target.

19 Claims, 5 Drawing Sheets

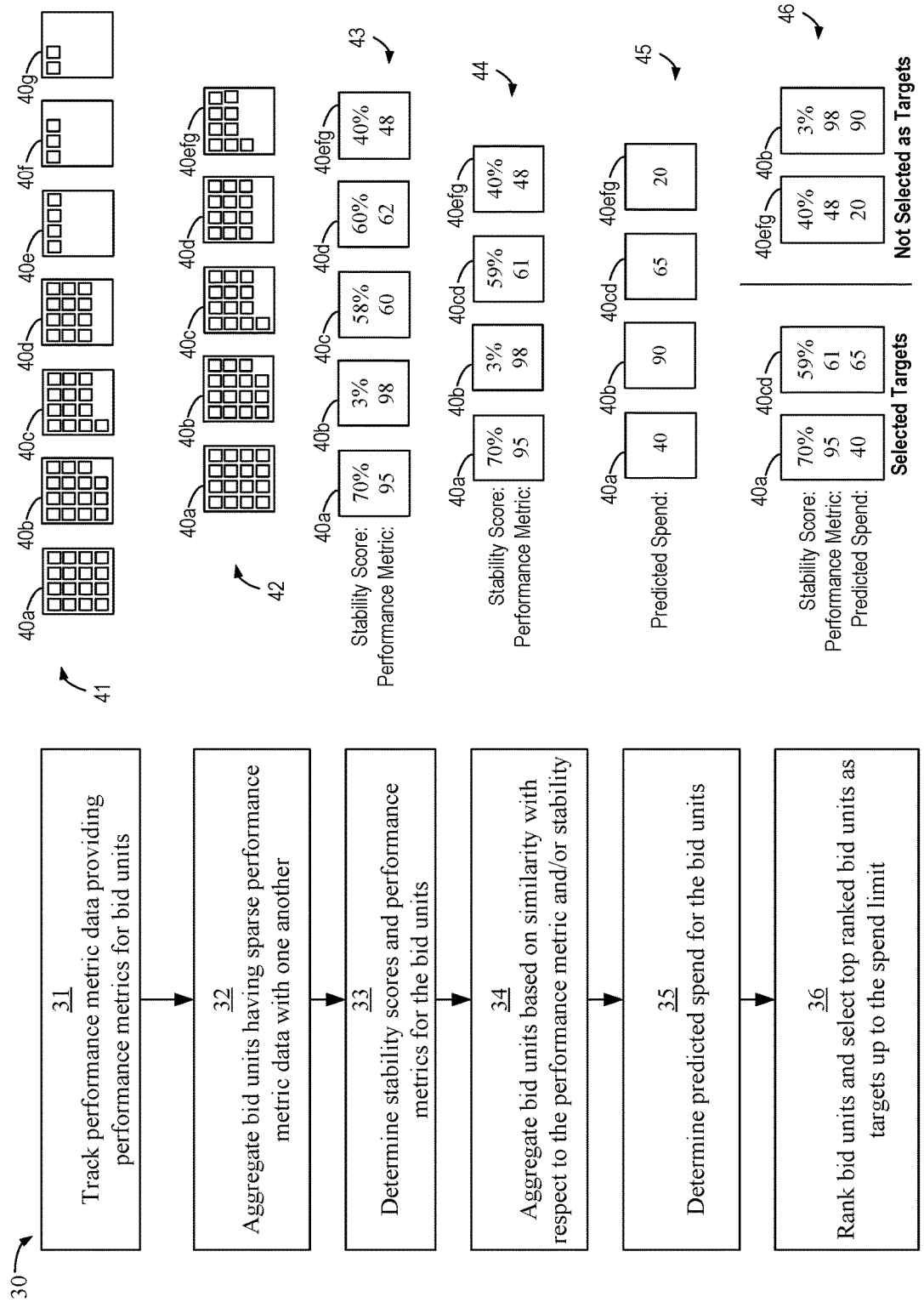

DISTRIBUTING ONLINE ADS BY TARGETING ONLINE AD REQUESTS

TECHNICAL FIELD

This disclosure relates generally to computer-implemented methods and systems and more particularly relates to improving the efficiency and effectiveness of computing systems used to manage and distribute online ads.

BACKGROUND

Elaborate computing systems are used to coordinate the display of online ads to visitors of web pages, search engine users, social media users, e-mail recipients, and other electronic device users. In a common example, a merchant (marketer) wanting to reach its customers (visitors) on some other company's website (publisher), like a sport television network's website, does so by bidding on one or more online ad-slots on the publisher's web pages. The publisher web pages have online ad-slots that are commonly auctioned via an online ad-exchange such as the DoubleClick Ad Exchange™ program by Google, Inc. of Mountain View, Calif. In addition, Demand Side Platforms (DSPs) such as Adobe® Media Optimizer, by Adobe Systems, Inc. of San Jose, Calif., place bids on behalf of marketers. When a visitor requests a publisher's web page, an online ad-exchange quickly runs an auction to a find a bidder. The online ad-exchange provides an online ad request that bidders bid upon and the winning bidder's (marketer's) online ad is displayed with the web page as an online ad impression. The visitor could then potentially take a desired action, such as clicking on the online ad, making a purchase on the marketer website, etc.

Every day there are billions of online ad requests requesting bids for available online ad-slots. Marketers and the automated systems that assist marketers continue to struggle to distinguish and select appropriate online ad requests for their ads. For example, showing an online ad about promotional offers in California to a person residing in India would be meaningless. On the other hand, it would make sense to display an online ad about tires on automobile related web pages.

Existing approaches attempt to select online ad requests based on context or user behavior. Contextual advertising approaches attempt to identify online ad requests by attempting to identify an online ad request context that matches the ad, for example, determining to place an ad for credit cards on webpages related to financial articles. Contextual advertising is generally based on the textual analysis of the webpage and thus requires extensive crawling of webpages followed by natural language processing. These processes require significant processing resources and time, making it infeasible to do contextual analysis of web pages, particularly in a real-time process that would need to respond to an online ad request very quickly. Behavioral advertising approaches attempt to identify online ad requests that involve users with particular characteristics. For example, a user's interests (e.g., sports and travel) are identified based on the webpages that he views. When an online ad request is received involving the user (e.g., the user accesses a webpage that has an open ad slot), a marketer with ads related to the user interests (e.g., sports and travel) places an ad there. These existing techniques for behavioral advertising, however, do not adequately address the sparsity of user data that is available. Data for a single user is sparse and generally insufficient to statistically deduce significant information about individual user interests, for example.

Existing techniques for selecting online ad requests to bid on also are unable to select online ad requests based on metric data about prior user actions for ads placed in response to online ad requests. Even though such performance metric data about user interactions is often tracked, existing approaches for selecting online requests are unable to identify characteristics of online ad requests to target using this data due to variance, sparsity, and volume issues in the data. With respect to data variance, for example, it may appear that visitors from California viewing ads on a particular sports website on a football related webpage yield high revenue on average. But the high average revenue may be largely due to a one-off purchase that should be considered an outlier.

Marketers are also unable to adequately address data sparsity. For example, it may appear that visitors from New York viewing ads on a news website on one of its news-related webpages do not yield much revenue. But the low revenue estimate may be due to the sample being only a few impressions.

Marketers are also unable to adequately address data volume differences. In one example, there are indicators of high revenue from a certain section of traffic, but the traffic might not be large enough to exhaust a campaign budget, while another section may have large enough traffic to exhaust an entire campaign budget within a few minutes. As another example, one might find that travel-related websites yield revenue of $10 for every 1000 impression, whereas news-related websites yield revenue of $1 for every 1000 impression. A marketer failing to take into account the volume differences may implement a strategy of bidding on both, which will consume the entire campaign budget on news-related websites within minutes rather than placing ads on the higher yielding travel-related website ad-slots that may trickle in slowly but with a sufficient pace to spend the budget over the day.

SUMMARY

Systems and methods are disclosed for distributing online ads by targeting online ad requests using test data to predict performance. The techniques can target ad requests in automated online advertising systems in which ad requests are generated by an ad exchange server and bids are placed by marketer devices in real time. The techniques aggregate bid units and compare bid unit characteristics to select bid units to target in ways that address data sparsity, variance, and volume issues.

Certain embodiments of the invention provide techniques for distributing online ads by targeting online ad requests using performance metric data and accounting for scarcity in the data. Performance metric data is tracked for online test ads provided in response to online ad requests during a test period. The performance metric data provides performance metrics for bid units that correspond to various combinations of values for online ad request dimensions. Bid units having sparse performance metric data with one another are aggregated. Bid units, including the aggregated bid units, are then selected as targets based on the performance metrics and online ads are distributed to ad recipients based on the bid units selected as targets. Specifically, distributing the online ads places online ads in response to the online ad requests having particular values for the online ad request dimensions corresponding to the bid units selected as targets.

Other embodiments of the invention additionally or alternatively provide techniques for distributing online ads by targeting online ad requests using performance metric data and accounting for variance issues in the data. Performance metric data is tracked for online test ads provided in response to online ad requests during a test period. Stability scores for bid units are determined based on stability of the performance metric data for the respective bid units. Bid units are then selected as targets based on the performance metric and the stability scores for the bid units, and online ads are distributed to ad recipients based on the bid units selected as targets.

Other embodiments of the invention additionally or alternatively provide techniques for distributing online ads by targeting online ad requests using performance metric data and accounting for volume differences. Performance metric data is tracked for online test ads provided in response to online ad requests. Bid units are aggregated based on similarity of the bid units to one another and bid units are ranked based on the performance metrics, stability, and/or predicted spend. The top ranked bid units are selected as targets to ensure that a campaign budget will be used effectively and online ads are distributed to ad recipients based on the bid units selected as targets.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 3 is a flow chart illustrating an exemplary method for distributing online ads by targeting online ad requests by using performance metric data.

FIG. 4 is a block diagram illustrating an exemplary use of bid units to illustrate the method of FIG. 3.

DETAILED DESCRIPTION

Figure 1:
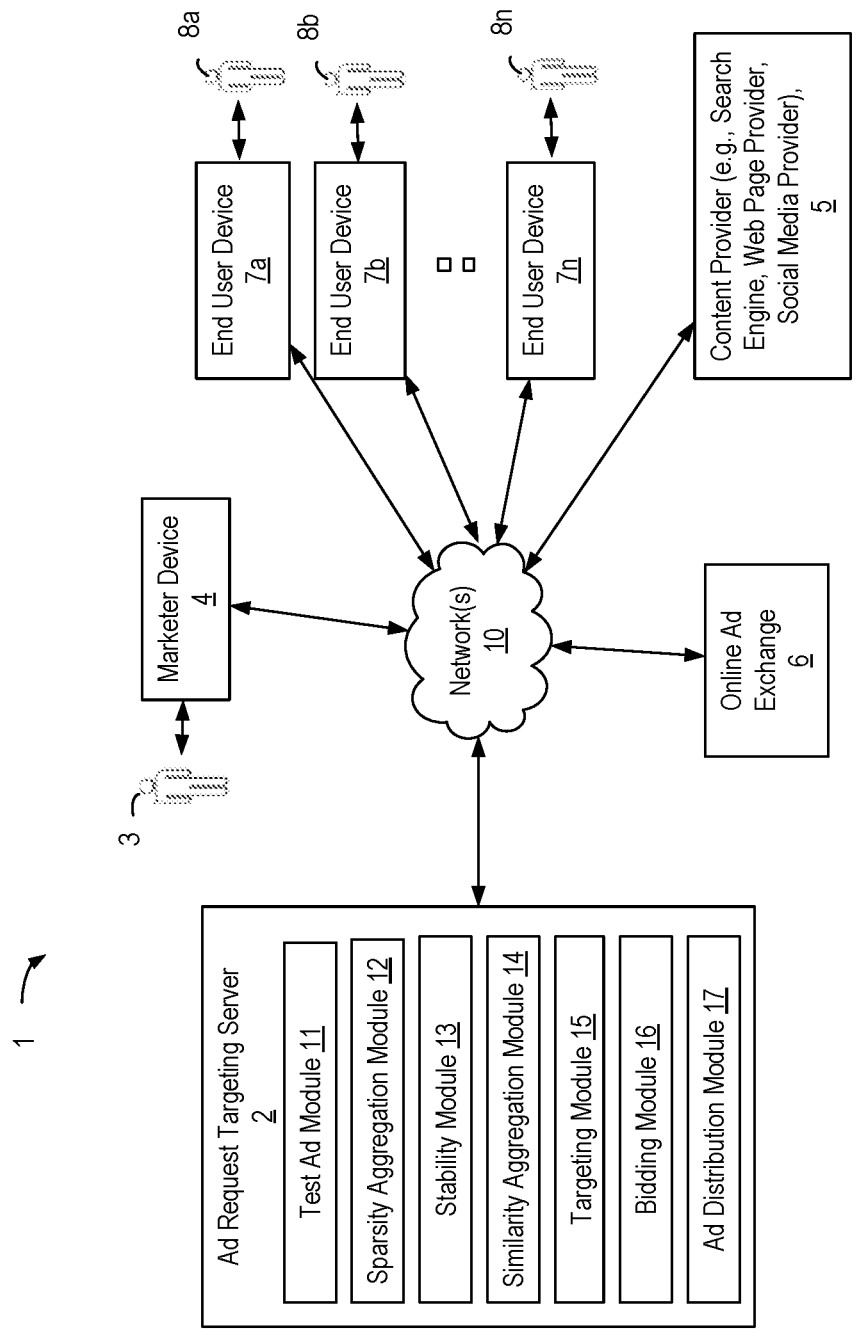
FIG. 1 illustrates an exemplary system for distributing online ads by targeting online ad requests by using performance metric data.

As discussed above, existing techniques for selecting online ad requests to bid on are unable to select online ad requests based on metric data about prior user actions for ads placed on online ad requests. Even though performance metric data about user interactions is often available, existing approaches for selecting online requests are unable to identify characteristics of online ad requests to target using this data due to variance, sparsity, and volume issues in the data. New techniques of the present invention facilitate distributing online ads by targeting online ad requests using techniques that use test data collected during a test period to predict ad performance while also accounting for data variance, data sparsity, and/or data volume issues. The techniques can target ad requests in automated online advertising systems in which ad requests are generated by an ad exchange server and bids are placed by marketer devices in real time, for example, to place ads in real time in response to user web page requests.

The techniques use bid units to represent unique combinations of online ad request dimensions. For example, one bid unit may cover any online ad requests that involve a browser of brand X and a customer in region A or in region B, etc. The techniques aggregate bid units and compare bid unit characteristics to select bid units to target in ways that address data sparsity, data variance, and data volume issues. Data sparsity issues are addressed by aggregating bid units to avoid using bid units having insufficient data, for example grouping together bid units that have less than a threshold amount of performance metric data. For example, if "region" is an online ad request dimension and bid units distinguish between values NY, WA, and AL and have observed spend amounts of less than one dollar per day, these regions are grouped together as a single combined region. Thus, bid units will then group NY, WA, and AL together. Data variance issues are addressed by computing a stability metric for bid units that enables discounting the effect of outliers. In one example, the percentage of days in which a performance metric (e.g., ROI) of a bid unit was above a median, average, or other value is used to distinguish bid units that have consistently high performance from bid units that have higher performance due to one-off spikes and other anomalies. Data volume and processing efficiency issues are addressed by grouping similar bid units based on similar metrics (e.g., normalized ROI) and/or similar stability scores, and then ranking the bid units based on stability, performance metric, and/or predicted spend and selecting the top ranked bid units to target. Thus, based on predicted spend of the bid units, only a number of bid units needed to cover the daily budget are selected as targets, reducing the chance that the budget will be wasted on lower ranked bid units that have higher volume numbers.

Terminology

As used herein, the phrase "online ad" refers to an item that promotes an idea, product, or service that is provided electronically in or with a web page, social media, keyword search result, e-mail, or other electronic communication sent, accessed by, or made available to one or more individuals through a computer network such as the Internet. Examples of online ads include, but are not limited to, images, text, graphics, sound, and/or video incorporated into a web page, search engine result, or social media content on a social media app or web page that advertise or otherwise promote or sell something, usually a business's product or service.

As used herein, the phrases "online ad request" refers to an online ad slot or other opportunity for placement of an online ad in or with a web page, social media, keyword search result, e-mail, or other electronic communication sent, accessed by, or made available to one or more individuals through a computer network such as the Internet.

As used herein, the phrase "online test ad" refers to an online ad that is provided and its performance tracked for the purpose of developing or adjusting an online ad distribution of similar online ads or ads for the same marketing campaign.

As used herein, the phrase "online ad request dimensions" refers to attributes of an online ad request. Online ad request dimensions include information about the website or other online ad opportunity (e.g., URL, category, webpage, keywords, ad position on a web page, etc.), information about the visitor (e.g., country, state, geographic region, language, device type, gender, age, etc.), and attributes of the particular online ad or ads (e.g., which campaign the online ad belongs to, what is the display size of the online ad, etc.)

The phrase "bid-unit" refers to a logical entity that can be bid upon. A bid unit identifies a set of online ad requests having one or more identified values for one or more online ad request dimensions. In other words, each unique combination of enumerations of various online ad request dimensions is a bid unit. For example, one bid unit includes all online ad requests in which the region is AL, WA, or DE and the browser is Browser Brand XYZ. As another example, another bid unit includes all online ad requests for sports-related webpages.

As used herein, the phrase "electronic content" refers to any content in an electronic communication such as a web page or e-mail accessed by, or made available to, one or more individuals through a computer network such as the Internet. Examples of electronic content include, but are not limited to, images, text, graphics, sound, and/or video incorporated into a web page, search engine result, or social media content on a social media app or web page.

As used herein, the phrase "performance" refers to an assessment of how well an online ad does with respect to achieving a marketing objective.

As used herein, the phrase "performance metric" refers to any measure of online ad performance. Examples include, but are not limited to, click-through rate, view-through rate, conversion rate, revenue per thousand impressions ("RPM") where revenue refers to any metric of interest that is trackable, e.g., measured in dollars, clicks, number of accounts opened and so on.

As used herein, the phrase "sparse" refers to an amount of data that is considered inadequate for a particular purpose. Thus, the particular amount of data that is considered sparse will depend upon the particular system implementation and requirements. Sparse data in one example is identified using a threshold. In one example, a bid unit associated with performance metrics for less than a particular number of impressions or spend amount is considered sparse.

As used herein, the phrase "stability" refers to a measure of an amount of variance in data. In one embodiment, stability is scored based on a percentage of time that data in a data set is above a particular value, such as an average or median value of a broader or other set of data that is considered stable.

As used herein, the phrases "campaign" and "marketing campaign" refer to a marketing effort comprising one or more online ads with a marketing objective such as increasing brand awareness for a particular brand. A campaign is associated with a "budget" that is to be spent over the duration of the campaign. A "budget" can be broken down into smaller increments, e.g., a daily budget, weekly budget, monthly budget, etc., for a given campaign. A "portfolio" includes one or more "campaigns."

As used herein the phrase "target" refers to a group of homogenous online ad requests characterized one or more online ad request dimensions. The requests within a given target are homogenous in their RPM values in one example.

As used herein, the phrase "bid" refers to an offer to pay an amount for a search, webpage, or social media online ad opportunity in response to an online ad request. Bids are used to place online ads in display advertising, search advertising, and social media advertising. The phrase "keyword bid" refers herein to an offer to pay to have an online ad provided by a search engine in search results that are provided in response to a search engine search in search advertising. Search advertising is sold and delivered on the basis of keywords. An individual uses a search engine to enter keywords to make queries. A "keyword" is one or more words. Several search engines conduct running auctions to sell online ads according to bids received for keywords and relevance to online ads. In display advertising, an online ad (e.g., an image, text, audio, and/or video) is provided along with web page content in response to requests from one or more individuals for the web page. For example, a banner ad location on a web page that is populated to display an online ad is an example of a web page location. Another example is an opportunity to provide a pop-up ad along with requested web page content. Another example is an opportunity to play audio along with requested web page content. In social media advertising, an online ad (e.g., an image, text, audio, and/or video) is provided along with social media content. An example is a location in a news feed for an online ad. Another example is a location within a series of shared content items from a given user or account, e.g., a location with a series of tweets.

FIG. 1 illustrates an exemplary system for distributing online ads by targeting online ad requests by using performance metric data. The exemplary computer network environment 1 includes a marketer device 4, an ad request targeting server 2, an exemplary content provider (publisher) server 5, an online ad exchange 6, and end user devices 7*a*-*n*. End user device 7*a*-*n* are used by visitors 8*a*-*n* to access electronic content via network 10 from content provider servers such as content provider server 5. A marketer 3 implements a marketing campaign to distribute online ads along with the electronic content that is obtained by the visitors 8*a*-*n* and viewed (or experienced) on end user devices 7*a*-*n*. For example, marketer 3 uses marketer device 4 to create several online ads and specifies a marketing campaign that is ultimately used to determine how a marketing campaign budget will be used to pay for placement of the online ads with the electronic content obtained by the visitors 8*a*-*n*.

Ad request targeting server 2 helps marketer 3 implement a marketing strategy by automatically placing online ads in response to online ad requests, for example, by bidding on online ad requests offered by online ad exchange 6 regarding placement of ads in electronic content provided by content provider server 5.

The ad request targeting server 2 includes a test ad module 11, a sparsity aggregation module 12, a stability module 13, a similarity aggregation module 14, a targeting module 15, a bidding module 16, and an ad distribution module 17. The test ad module 11 distributes online ads to test a variety of online ad request dimensions and tracks results during a test period. For example, the test ad module 11 bids across the inventory (i.e., without targeting particular characteristics) of online ad requests offered by online ad exchange 6 and thus places bids for a variety of combinations of geographic locations, categories, visitor attributes, etc. The test ad module 11 keeps track of the performance of the online test ads that are distributed by the test ad module 11. For example, the test ad module 11 tracks click through rates on the online ads as a performance metric. The sparsity aggregation module 13 eliminates sparse data within bid units by aggregating dimension values within dimensions for the bid units. The stability module 13 attempts to ensure that targets are not selected based on one-off outlier data or other anomalies, for example, by prioritizing bid units that have more stable data over bid units that have less stable data. The similarity aggregation module 14 aggregates bid units that have similar performance metrics and/or stability values. Such aggregation can improve efficiency, and/or to otherwise simplify the targeting techniques.

The targeting module 15 selects bid units as targets. In one example, the targeting module 15 ranks bid units based on stability and performance and selects the top ranked bid units as targets. The number of bid units selected as targets in one example is selected to spend a budget of a campaign to place online ads in response to online ad requests having particular online ad request dimensions. Spend predictions are made based the performance metrics of how much will be spent on a given bid unit if it is selected as a target and the top bid units in the ranked list are selected having a combined predicted spend sufficient to spend the daily budget and additional bid units in the ranked list are not selected as targets. This avoids wasting the budget on lower ranked bid units that may have higher volume than the top ranked bid units.

The bidding module 16 bids on the online ad requests to control the distribution of online ads by the ad distribution module 17. The bidding module 16 also determines appropriate bid amounts based on information about the campaign and other bidding criteria. In one embodiment of the invention, the bidding module 16 determines a bid landscape for individual online ad request targets. The bid landscapes identify an expected performance metric for different incurred bid costs. The bid landscapes are used to perform an optimization that determines bid values for the online ad request targets to spend a campaign budget to maximize the performance metric. In this way, the bidding module 16 helps the marketer 3 best achieve marketing objectives in the fast paced computing environment of online ad placement bidding.

The ad request targeting server 2 thus helps marketer 3 implement a marketing strategy by placing online ads in response to online ad requests. In certain embodiments of the invention, the processes performed by the test ad module 11, the sparsity aggregation module 12, the stability module 13, the similarity aggregation module 14, the targeting module 15, the bidding module 16, and the ad distribution module 17 are performed entirely automatically such that the marketer does not need to provide input or control these processes. Performing some or all of these processes automatically can ensure that the ad request targeting server 2 is able to respond to online ad requests within a desired time frame. For example, placing ads on certain online ad systems requires responding to online ad requests within milliseconds. In certain embodiments of the invention, the processes performed by the ad request targeting server 2 involve input from marketer 3. For example, the marketer 3 can set parameters, such as the amount of a budget that will be sent on testing, the frequency of testing, etc. As another example, the marketer 3 can provide input approving, editing, or rejecting the bid units that are selected for targeting.

Figure 2:
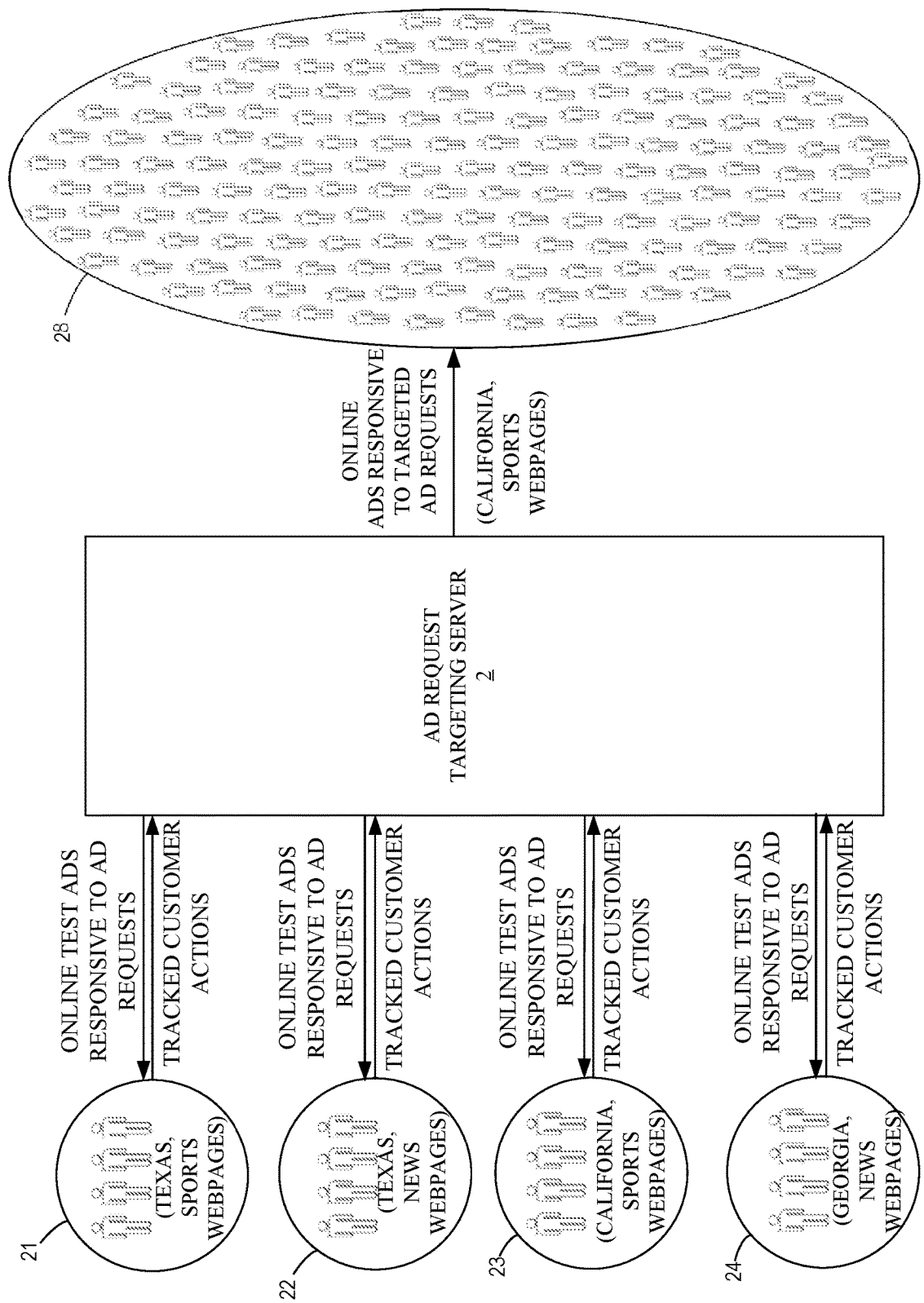
FIG. 2 illustrates an example of using online test ads to estimate performance metrics used to distributed online ads.

FIG. 2 illustrates an example of using online test ads to estimate performance of online ad request dimensions used to distributed online ads. In this example ad targeting server 2 sends online test ads responsive to online ad requests having a variety of online ad request dimensions. In this example, online test ads are shown to be distributed to visitors in four groups for illustrative purposes. Additional online test ads (not shown) are also sent to test additional online ad request dimension combinations. In many practical implementations, the number of dimensions and permutations of dimensions will be significantly larger. The online test ads need not be sent to all possible permutations of dimension combinations, but it is generally desirable to send online test ads to test enough combinations that statistically meaningful conclusions can be drawn regarding bid unit performance metrics for many or all of the bid units.

In the example of FIG. 2, online test ads are distributed in response to online ad requests 21 that have a visitor location dimension of "Texas" and a webpage category dimension of "Sports." Another group of online test ads are distributed in response to online ad requests 22 that have a visitor location dimension of "Texas" and a webpage category dimension of "News." A third group of online test ads are distributed in response to online ad requests 23 that have a visitor location dimension of "California" and a webpage category dimension of "Sports." A fourth group of online test ads are distributed in response to online ad requests 24 that have a visitor location dimension of "Georgia" and a webpage category dimension of "News."

Customer actions responsive to the test online ads distributed with the online ad requests 21-24 are tracked by ad targeting server 2. In other implementations, tracking functionality is performed via a separate device, system, and/or entity. The tracked customer actions in response to the online test ads are used to create tracked metrics for the online test ads. These tracked metrics for the online test ads are used to determine estimated performance of online ad request dimensions. In a specific example, the technique determines that 7% of the online ads distributed in response to online ad requests with the category "Sports" converted but only 2% of the online ads distributed in response to online ad requests with the category "News" converted. Similarly, the technique determines that 8% of the online ads distributed in response to online ad requests for visitors in California converted, 4% of the online ads distributed in response to online ad requests for visitors in Texas converted, and only 1% of the online ads distributed in response to online ad requests for visitors in Georgia converted.

The estimated performance of online ad request dimensions 26 are used to determine performance metrics for bid units. The bid units are adjusted and compared using techniques described herein and bid units are selected as targets. In this example, the technique determines that a bid unit requiring a category dimension of "Sports" and a visitor state dimension of "California" is selected as a target. Additional targets are also selected but not shown to simplify the example. Online ads responsive to targeted online ad requests are then distributed to deliver online ads to visitors 28. In this way, the technique is able to test online ad request dimensions, adjust and compare bid units, and select appropriate bid units for targeting to best achieve campaign objectives.

FIG. 3 is a flow chart illustrating an exemplary method 30 for distributing online ads by targeting online ad requests by using performance metric data. FIG. 4 is a block diagram illustrating an exemplary use of bid units to illustrate the method of FIG. 3. The method 30 can be performed by any appropriate computing device such as by ad request targeting server 2 of FIG. 1.

Method 30 begins by tracking performance metrics data providing performance metrics for bid units, as shown in block 31. Such an initial learning or data-gathering phase can last a few days, weeks, a month, or months, and involve spending a small percentage of a total budget to place ads on general available inventory. Some of the ads result in the desired action, such as conversion. In one embodiment of the invention, the technique starts with historic cost, impression, and revenue data for each bid unit over a period of time, e.g., 30 days, and traffic and win-rates are estimated for every bid unit. FIG. 4 illustrates an initial exemplary set 41 of bid units 40a, 40b, 40c, 40d, 40e, 40f, and 40g and performance metric data for each bid unit. In this example, bid units 40a, 40b, 40c, and 40d each have more than a threshold 10 instances of performance metric data, while bid units 40e, 40f, and 40g have less than the threshold 10 instances of performance metric data.

Method 30 of FIG. 3 next involves aggregating bid units having sparse performance metric data with one another, as shown in block 32. The technique aggregates data where it recognizes that there is not sufficient data within individual enumerations to draw statistically reliable conclusions. In one example, the computing device groups together data with less than a threshold number of impression or spend. For example, if regions NY, WA, and AL have each observed spend of less than a dollar per day, those regions are grouped together, for example, in a new region called "other." Cost, impression, and revenue data are accumulated again based on the new grouping. FIG. 4 illustrates aggregating bid units from the initial exemplary set 41 using a threshold of 10 into a second set 42 of bid units. In this example, bid units 40e, 40f, and 40g are combined into bid unit 40efg.

Figure 5:
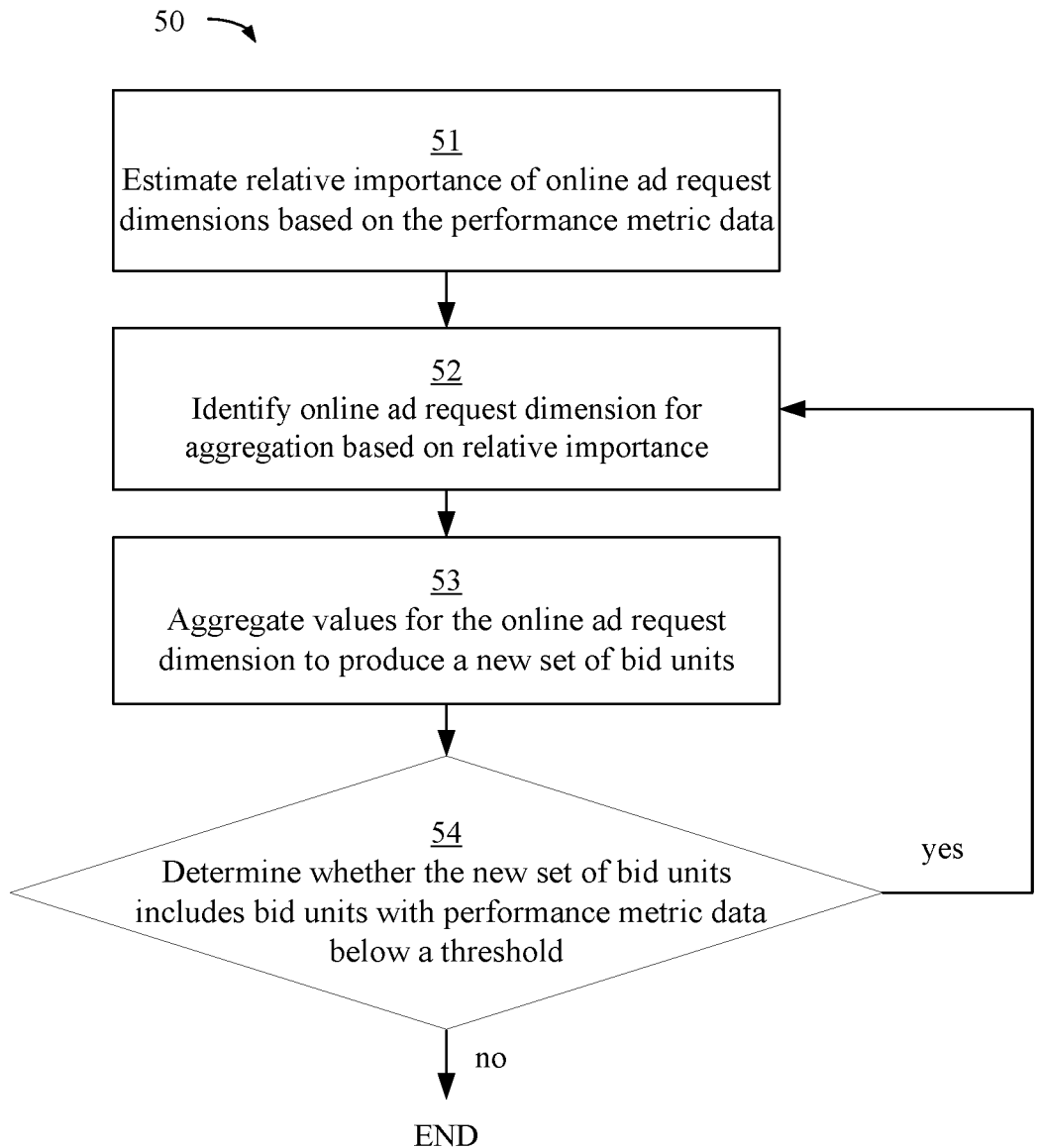
FIG. 5 is a flow chart illustrating an exemplary method for aggregating bid units based on scarcity of performance metric data in respective bid units.

The aggregation can be performed based on ranking of dimensions, for example using the technique of FIG. 5. FIG. 5 is a flow chart illustrating an exemplary method 50 for aggregating bid units based on scarcity of performance metric data in respective bid units. Method 50 involves estimating relative importance of online ad request dimensions based on performance metric data, as shown in block 51. Method 50 involves identifying an online ad request dimension for aggregation based on relative dimension importance, as shown in block 52. In one example, the aggregating is performed for each dimension in the order of significance, with the least significant dimension grouped first. Method 50 aggregates values for the online ad request dimension to produce a new set of bid units, as shown in block 53, and then determines whether the new set of bid units includes bid units with performance metric data below the threshold, as shown in block 54. If not, the method returns to block 52 to select another dimension to aggregate values for, for example, selecting the next least significant dimension. The method 50 thus iterates until the scarcity is eliminated from the data. Generally, the grouping ensures that there is sufficient data for the bid units of interest. Grouping in the order of dimension significance ensures that the variance in the dimensions is best used.

Returning to FIG. 3, after aggregating bid units having sparse performance metric data, the method 30 determines stability scores and performance metrics for the bid units, as shown in block 33. Stability scores are used to ensure that one-off outliers and other variance issues do not result in selecting bid units based on such outliers and variance issues. In one embodiment of the invention, the technique considers an average performance metric such as ROI over all bid unites over a time frame and determines a percentage of the time the bid unites have an above average performance metric. If the percentage is low for a bid unit that has an above average performance, this suggests that the above average performance is likely do to outliers rather than consistently high performance. For example, all bid units may have an average ROI for the last 30 days of 10 conversions per day. A particular bid unit, however, may have an average ROI of 20 conversions per day. However, the bid unit may have had one day that had 197 conversions. The other 29 days may have had less than 10 conversions per day. Because of the one day with 197 conversions, the average ROI is misleading and tends to suggest that the bid unit will have better performance than it actually will. To identify such one-off and other anomalous scenarios, one embodiment of the invention examines the percentage of time that the bid unit outperforms the average, which in this example is only 1 in 30 days or approximately 3%. This low percentage indicates that that the above average performance metric is likely due to an outlier or other variance issue. FIG. 4 illustrates a third set of graphics 43 illustrating performance and stability scores for the second set 42 of bid units. Notably, the stability score for the bid unit 40b is only 3%, suggesting that the bid unit's better than average performance metric is likely due to an outlier or other variance issue.

Method 30 of FIG. 3 next involves aggregating bid units based on similarity with respect to the performance metric and/or stability, as shown in block 34. In one embodiment of the invention, the technique uses an algorithm to group similar bid units together so that the targets are more stable with better performance and impression estimates. This step aggregates bid units with similar performance (e.g., ROI) and stability scores. Grouping based on similar performance and/or stability scores provides a way to reduce the number of bid units to improve computational efficiency and memory usage. FIG. 4 illustrates a fourth set of graphics 44 illustrating bid units aggregated based on similarity. In this example, bid unit 40c and 40d are combined into bid unit 40cd based on the similarity of their stability scores and performance metrics.

One embodiment of the invention uses the following exemplary technique to aggregate bid units based on similarity. The technique first normalizes the performance metric and stability to be in the range of (0,1) and defines a similarity score as an average of the normalized performance metric and stability. In this example, a lower score represents more similarity than a higher score and the technique considers bid units to be similar for aggregation purposes if their normalized performance metrics and stability scores are within a pre-defined threshold. The following algorithm is used to merge the bid units:

1. Initialize merged_set={ }
2. Iterate over all bid units
    a. Iterate over merged_set
        i. Compute score of bid-unit with merged-bid-unit.
        ii. Find best match based on above defined criteria.
    b. If no similar bid unit is found in merged-set (similarity score below a chosen threshold), add bid-unit as new entry in merged_set.
    c. If a similar bid unit is found in merged-set, merge both bid units.
    d. Merging two bid units implies aggregating data for example for impressions, cost, revenue, and/or requests while re-computing performance metrics and stability and normalizing the metrics.

After aggregating bid units based on similarity, method 30 of FIG. 3 determines a predicted spend for each of the bid units, as shown in block 35. In one embodiment of the invention, this involves combining estimates of the number of online ad requests that will be received for any particular bid unit, estimating the win rate, and estimating the cost per impression using a particular bid amount (i.e., what would be spent if payment was based on a second price option, etc.) These values are combined to estimate a prediction of what would be spent for a particular bid unit. FIG. 4 illustrates a fifth set of graphics 45 illustrating predicted spend for the bid units.

Method 30 of FIG. 3 ranks the bid units based on stability, performance, and/or predicted spend and selects the top ranked bid units as targets up to a spending limit, as shown in block 36. FIG. 4 illustrates a sixth set of graphics 46 illustrating a ranked order or bid units in which the two selected bid units 40*a*, 40*cd* have predicted spends that total 105 (40+65) which is greater than the 100 spend limit. Accordingly, selecting these bid units 40*a*, 40*cd* as the targets is predicted to spend the entire daily budget. Bid units 40*efg* and 40*b* are not selected as targets ensuring that the budget is not wasted pursuing those bid units.

The method 30 can further involve determining bids amounts to use. For example, this can involve determining a bid landscapes for bid units and using the bid landscapes to determined optimum bid values. In one example, determining bid values is based on an optimization problem model in which the optimization attempts to maximize the revenue obtained by bidding on various targets, subject to the constraint that the cost incurred is equal to the available budget. In mathematical terms, the problem is stated as:

max(Revenue$_i$) s.t. sum(cost$_i$)=Budget where

Revenue$_i$ is the estimate of revenue we get from i$^{th}$ target.
Cost$_i$ is the estimate of spend on i$^{th}$ target.

In one implementation, functions are used to estimate the values of cost and revenue for a given bid unit target and bid value. For example a Rev (i,j) function can return a Revenue$_{ij}$ and a Cost(i,j) function can return Cost$_{ij}$. This forms a Linear Programming (LP) problem and the system of equations is solved to arrive at the optimal bid values for each target.

The result of method 30 of FIG. 3 is a selection of bid units as targets for a marketing campaign for a particular time period, such as a day. The technique can be rerun prior to each subsequent time period to adjust the targets based on changes in performance metric data and/or campaign parameters such as daily spend amounts. A computing device can automatically execute the steps of method 30 to produce a daily online ad request targeting plan that is then automatically implemented by the same or another computing device. The online ad request targeting plan is specifically targeted based on historical performance metric data and adequately accounts for data sparsity, variance, and volume issues.

Embodiments of the invention additionally or alternatively continue to learn based on ongoing data that is received as online ads are distributed over time using an online ad request strategy. The performance metric data is supplemented with additional performance metric data and the campaign parameters are adjusted over time as more and more online ads are placed. In one example, a certain portion of a campaign budget (e.g., 95%) is used for bid units for which the data provides a relatively high degree of confidence that bidding on the bid units will result in favorable performance (e.g., high ROI, etc.). The remaining portion of the campaign budget (e.g., 5%) is used to explore bid units for which there is little confidence in how well the bid units will perform because of insufficient data regarding the bid units' performance. Over time, bid units for which there is initially little information are explored and additional high performing bid units are identified with increasing confidence. One embodiment of the invention uses the variance of bid unit performance data to identify bid units to explore. The performance of bid units with high variance is less certain but at least some of these bid units are expected to turn out to have favorable performance with high confidence upon exploration. Thus, this embodiment of the invention spends a portion of a campaign budget to explore bid units based on identifying relatively high variance in performance of the bid units and, over time, is able to reduce the variance of the performance data for those bid units to identify bid units with favorable performance with higher confidence that will be targeted in the future.

Exemplary Computing Environment

Figure 6:
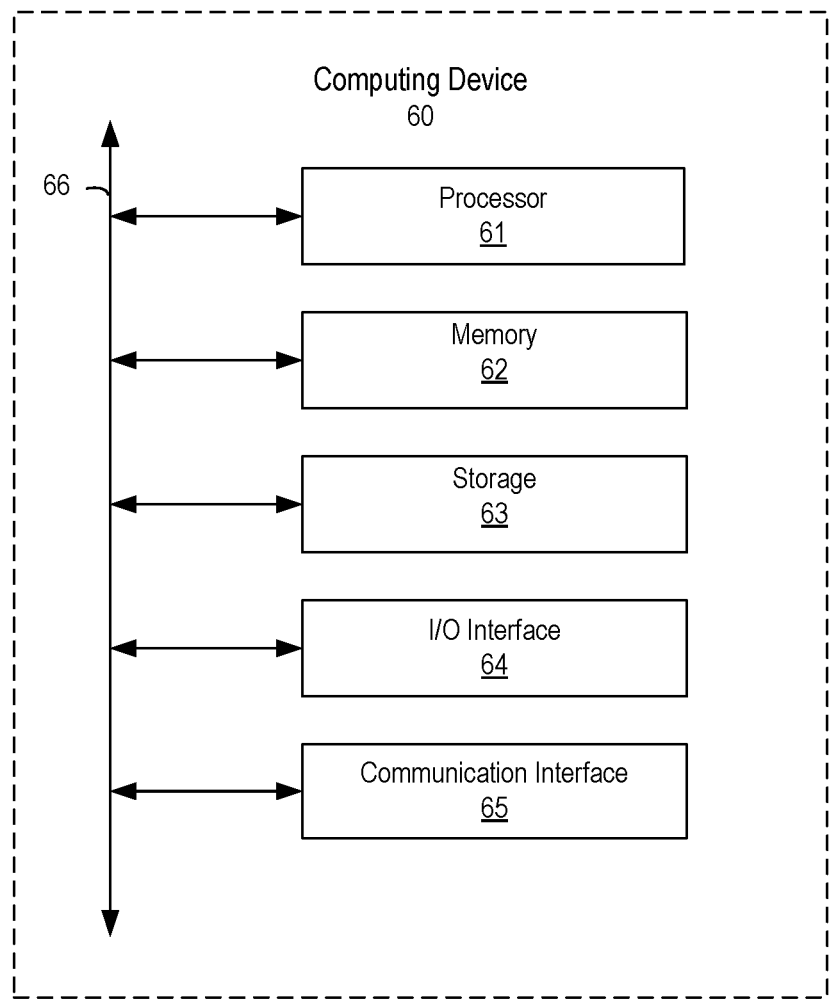
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for distributing online ads by targeting online ad requests in automated online advertising systems in which online ad requests are generated by an ad exchange server and bids are placed for marketer devices in real time as web pages are loaded for viewing, the method comprising:

tracking, by a targeting server, performance metric data for online test ads provided in the web pages in response to the online ad requests generated by the ad exchange server, the performance metric data providing performance metrics for bid units, the bid units corresponding to combinations of values for online ad request dimensions;

selecting sparse bid units based on identifying those of the bid units having sparse performance metric data;

aggregating, by the targeting server, the sparse bid units with one another to obtain an aggregated bid unit;

selecting, by the targeting server, one or more of the bid units, including the aggregated bid unit, as targets on which to spend a budget of a campaign to place online ads into the web pages as the web pages are loaded for viewing and in response to the online ad requests, the one or more bid units selected as the targets based on the performance metric for the bid units;

selecting, by the targeting server and based on the one or more bid units selected as the targets, a subset of the online ads corresponding to the online test ads that are responsive to the online ad requests which have values for the online ad request dimensions corresponding to the one or more bid units selected as targets;

distributing, by the targeting server, the subset of the online ads to first ad recipients within the web pages being loaded for viewing by the first ad recipients;

selecting, by the targeting server, bid units having performance metric data with high variance as additional targets;

distributing, by the targeting server, the subset of the online ads based on the bid units selected as the additional targets;

tracking, by the targeting server, additional performance metric data for the subset of the online ads distributed based on the bid units selected as the additional targets;

selecting, by the targeting server, bid units as updated targets based on the additional performance metric data for the bid units selected as the additional targets;

tracking, by the targeting server, subsequent performance metric data to iteratively refine the bid units selected as the updated targets based on the additional performance metric data;

selecting, by the targeting server and based on the bid units selected as the updated targets, an updated subset of the online ads which have values for the online ad request dimensions corresponding to the bid units selected as the updated targets; and distributing, by the targeting server, the updated subset of the online ads to second ad recipients within the web pages being loaded for viewing by the second ad recipients.

2. The method of claim 1, wherein aggregating sparse bid units comprises:

identifying the sparse bid units based on the sparse bid units having less than a threshold amount of performance metric data; and combining groups of two or more of the sparse bid units together into combined bid units that have at least the threshold amount of performance metric data.

3. The method of claim 1, wherein the aggregating combines sparse bid units by iteratively:

identifying an online ad request dimension to aggregate;

aggregating values for the online ad request dimension to produce a new set of bid units; and determining whether to aggregate an additional online ad request dimension based on whether the new set of bid units includes bid units with performance metric data below a threshold.

4. The method of claim 3 further comprising estimating relative importance of the online ad request dimensions based on the performance metric data, wherein aggregating the bid units comprises aggregating values for relatively less important online ad request dimensions before aggregating values for relatively more important online ad request dimensions.

5. The method of claim 1, wherein selecting the bid units as the targets is also based on stability of the respective bid units.

6. The method of claim 5 further comprising assessing stability scores for the bid units by comparing the performance metrics for respective bid units at multiple time periods with an average performance metric to determine a percentage of time periods that the performance metrics for respective bid units are above the average performance metric.

7. The method of claim 1 further comprising further aggregating, by the computing device, bid units to be considered for selection as targets based on similarity with respect to the performance metric.

8. The method of claim 1 further comprising further aggregating, by the computing device, bid units to be considered for selection as targets based on similarity with respect to stability.

9. The method of claim 1 further comprising determining, by the computing device, a predicted spend for individual bid units, wherein selecting the bid units as the targets is based on the predicted spend.

10. The method of claim 1, wherein selecting the bid units as the targets comprises ranking the bid units using stability and the performance metric as ranking key and selecting as the targets those of the bid units with higher ranks.

11. The method of claim 1, wherein the performance metric is revenue per thousand impressions (RPMs).

12. A method for distributing online ads by targeting online ad requests in automated online advertising systems in which ad requests are generated by an ad exchange server and bids are placed by marketer devices in real time as web pages are loaded for viewing, the method comprising:
tracking, by a targeting server, performance metric data for online test ads provided in the web pages in response to the online ad requests generated by the ad exchange server, the performance metric data providing performance metrics for bid units, the bid units corresponding to combinations of values for online ad request dimensions;
determining, by the targeting server, stability scores for the bid units based on stability of the performance metric data for the respective bid units;
selecting, by the targeting server, bid units with similar stability scores;
aggregating, by the targeting server, the selected bid units with one another to obtain an aggregated bid unit;
selecting, by the targeting server, one or more of the bid units, including the aggregated bid unit, as targets based on the performance metric and stability scores for the bid units, the bid units selected as targets to spend a budget of a campaign to place online ads into the web pages as the web pages are loaded for viewing and in response to online ad requests;
selecting, by the targeting server and based on the one or more bid units selected as the targets, a subset of the online ads corresponding to the online test ads that are responsive to the online ad requests which have values for the online ad request dimensions corresponding to the one or more bid units selected as targets;
distributing, by the targeting server, the subset of the online ads to first ad recipients within the web pages being loaded for viewing by the first ad recipients;
selecting, by the targeting server, bid units having performance metric data with high variance as additional targets;
distributing, by the targeting server, the subset of the online ads based on the bid units selected as the additional targets;
tracking, by the targeting server, additional performance metric data for the subset of the online ads distributed based on the bid units selected as the additional targets;
selecting, by the targeting server, bid units as updated targets based on the additional performance metric data for the bid units selected as the additional targets;
tracking, by the targeting server, subsequent performance metric data to iteratively refine the bid units selected as the updated targets based on the additional performance metric data;
selecting, by the targeting server and based on the bid units selected as the updated targets, an updated subset of the online ads which have values for the online ad request dimensions corresponding to the bid units selected as the updated targets; and
distributing, by the targeting server, the updated subset of the online ads to second ad recipients within the web pages being loaded for viewing by the second ad recipients.

13. The method of claim 12, wherein the stability scores are determined by:
determining performance metrics for respective bid units at multiple time periods;
comparing the performance metrics for respective bid units at multiple time periods with an average performance metric;
determining a percentage of time periods that the performance metric for respective bid units are above average;
determining the stability scores for the bid units based on the percentage of time periods that the performance metric for respective bid units are above average.

14. The method of claim 12 further comprising further aggregating bid units based on similarity with respect to stability, wherein aggregating bid units based on similarity with respect to stability comprises identifying bid units to aggregate with one another by identifying bid units having stability scores within a predetermined threshold of one another or within a predetermined range.

15. The method of claim 12 further comprising further aggregating bid units based on similarity with respect to stability and the performance metric.

16. The method of claim 12, wherein selecting the bid units as targets comprises ranking the bid units by jointly using stability and the performance metric as ranking keys and selecting bid units with higher ranks as the targets.

17. A method for distributing online ads by targeting online ad requests in automated online advertising systems in which ad requests are generated by an ad exchange server and bids are placed by marketer devices in real time as web pages are loaded for viewing, the method comprising:
tracking, by a targeting server, performance metric data for online test ads provided in the web pages in response to the online ad requests generated by the ad exchange server, the performance metric data providing performance metrics for bid units, the bid units corresponding to combinations of values for online ad request dimensions;

aggregating, by the targeting server, bid units based on similarity of the performance metrics of the bid units to one another, to obtain an aggregated bid unit;

ranking, by the targeting server, the bid units, including the aggregated bid unit;

selecting, by the targeting server, top ranked bid units as targets, wherein a number of top ranked bid units to select as targets is based on predicted spend amounts for the bid units and a budget of a campaign to place online ads into the web pages as the web pages are loaded for viewing and in response to the online ad requests;

selecting, by the targeting server and based on the top ranked bid units selected as the targets, a subset of the online ads corresponding to the online test ads that are responsive to the online ad requests which have values for the online ad request dimensions corresponding to the top ranked bid units selected as the targets;

distributing, by the targeting server, the subset of the online ads to first ad recipients within the web pages being loaded for viewing by the first ad recipients;

selecting, by the targeting server, bid units having performance metric data with high variance as additional targets;

distributing, by the targeting server, the subset of the online ads based on the bid units selected as the additional targets;

tracking, by the targeting server, additional performance metric data for the subset of the online ads distributed based on the bid units selected as the additional targets;

selecting, by the targeting server, bid units as updated targets based on the additional performance metric data for the bid units selected as the additional targets;

tracking, by the targeting server, subsequent performance metric data to iteratively refine the bid units selected as the updated targets based on the additional performance metric data;

selecting, by the targeting server and based on the bid units selected as the updated targets, an updated subset of the online ads which have values for the online ad request dimensions corresponding to the bid units selected as the updated targets; and distributing, by the targeting server, the updated subset of the online ads to second ad recipients within the web pages being loaded for viewing by the second ad recipients.

18. The method of claim 17, wherein aggregating the bid units based on similarity comprises identifying bid units to aggregate to aggregate with one another by identifying bid units having performance metrics within a predetermined threshold of one another or within a predetermined range.

19. The method of claim 17, wherein bid units are aggregated based on similarity with respect to stability, wherein aggregating bid units based on similarity with respect to stability comprises identifying bid units to aggregate with one another by identifying bid units having stability scores within a predetermined threshold of one another or within a predetermined range.

* * * * *